United States Patent [19]

Gennetten

[11] Patent Number: 5,285,271
[45] Date of Patent: Feb. 8, 1994

[54] DIGITAL COLOR MATRIXING CIRCUIT

[75] Inventor: Kenneth D. Gennetten, Fort Collins, Colo.

[73] Assignee: Hewlett-Packard Company, Palo Alto, Calif.

[21] Appl. No.: 700,008

[22] Filed: May 14, 1991

[51] Int. Cl.$^5$ .............................. H04N 1/46
[52] U.S. Cl. ............................ 358/500; 358/527; 382/17
[58] Field of Search ............. 358/30, 75, 80; 382/17

[56] References Cited

U.S. PATENT DOCUMENTS

| | | | |
|---|---|---|---|
| 4,658,286 | 4/1987 | Schwartz et al. | 358/37 |
| 4,706,210 | 11/1987 | Snelling et al. | 364/758 |
| 4,709,144 | 11/1987 | Vincent | 250/226 |
| 4,789,892 | 12/1988 | Tsuzuki et al. | 358/75 |
| 4,806,750 | 2/1989 | Vincent | 250/226 |
| 4,839,719 | 6/1989 | Hirota et al. | 358/75 |
| 4,870,268 | 9/1989 | Vincent et al. | 250/226 |
| 4,879,677 | 11/1989 | Shiraishi | 364/760 |
| 4,887,150 | 12/1989 | Chiba et al. | 358/80 |
| 4,989,079 | 1/1991 | Ito | 358/80 |
| 5,001,663 | 3/1991 | Parulski et al. | 364/760 |
| 5,109,273 | 5/1992 | Parulski et al. | 358/78 |

FOREIGN PATENT DOCUMENTS

WO90/05425 5/1990 World Int. Prop. O. ...... H04N 1/46
WO90/13867 11/1990 World Int. Prop. O. ... G06F 7/544

Primary Examiner—Richard E. Chilcot, Jr.
Assistant Examiner—Rafael Bacares

[57] ABSTRACT

An image scanning device, including CCDs provides digital color image data representing an image. A 3-by-3 matrix multiply logic is connected to the image scanning device for modifying or transforming the intensities of each individual color encoded in the digital color image data. The matrix multiply logic has a multiplier and an accumulator. The multiplier provides intermediate products by performing one-stage multiplications between the intensity values for each pixel and the coefficients of the 3-by-3 matrix. The one-stage multiplications are time multiplexed. The accumulator accumulates the intermediate products from the multiplier for each pixel to thereby provide optimized color values for each pixel. The multiplier implements specialized adders to perform the one-stage multiplications.

6 Claims, 6 Drawing Sheets

DIGITAL COLOR MATRIXING CIRCUIT

BACKGROUND OF THE INVENTION

I. Field of the Invention

The present invention relates generally to image processing in computers and, more particularly, to a system and method for the optimization or transformation of color image data derived from an image sensor.

II. Related Art

Image scanning devices have been known in the art for some time. Generally, a scanning device controls an image sensor which is exposed to an image. From the electromagnetic energy (light) projected from the image, the image sensor stores an electrical representation.

Well known in the art, a charge couple device (CCD) is a specific type of image sensor. Essentially, a CCD is an image sensing memory device, which is attractive to designers in the art because of its high packing density and low power consumption. CCDs are often used in video cameras and the like.

Generally, a CCD observes and stores a two-dimensional (2D) representation of the image. A CCD has a grid-like structure with an 2D array of elements, known in the art as picture elements, or pixels. The pixels are arranged in orthogonal rows and columns. Each individual pixel stores the light intensity incident to it from a particular position on the image, to thereby store collectively a mirror-like 2D image. Ultimately, the signals stored in these individual elements are used to illuminate small picture elements, or pixels, on a display.

In contrast to area CCDs having a 2D array structure of elements, a "linear" CCD has only a single row of elements. Linear CCDs sample only one line from an image at a time, as opposed to an area which is comprised of many lines. Linear CCDs are used for facsimile machines and other machines which scan documents.

If only a single CCD is implemented in a scanning device, then the representation will ultimately be reproduced on a display as a binary image or as a gray scale image. In a binary image, the image is reproduced with merely black and white based upon thresholds of light intensities stored by the CCD elements. Whereas in a gray scale image, shades of gray are available to reproduce the image, which shades are based upon the varying light intensities stored by the CCD elements.

Conventional scanning devices are often designed to acquire color representations of images. For color representations, at least three separate CCDs must be implemented to observe each element in the image. One CCD corresponds with each of three primary colors in a tristimulus color space wherein all colors can be reproduced. A tristimulus color space is a color space described in terms of the relative intensities of three different lights.

The actual color of the lights is generally unrestricted. For example, the colors red, green, and blue are often used. Each CCD observes and stores the intensity of its respective color in the image. The most universally recognized color space is called CIEXYZ, where X, Y, and Z represent three different imaginary lights.

In the pursuit of acquiring color representations of images, controllable filters and, perhaps, beamsplitters are associated with each of the three CCDs. Essentially, the filters and beamsplitters control the exposure of each CCD to the image. U.S. Pat. No. 4,709,144 to Vincent, U.S. Pat. No. 4,870,268 to Vincent et al., and U.S. Pat. No. 4,806,750 to Vincent, which are all related and are assigned to the assignee of the present application, disclose trichromatic beamsplitter for separating a projected image into its three color components. The foregoing technology is particularly useful in practicing the present invention.

After an image is stored by the image scanning device, the image data, which is in the form of three analog color signals, is sent to an analog-to-digital convertor where the analog signals are transformed into three digital color signals. One digital signal corresponds with each of the primary colors.

Next, the image data travels, perhaps, through an image processor which manipulates the data in any desired fashion. For example, the image processor could have logic for scaling the image, for adjusting contrast and/or brightness, for controlling communications between itself and the host computer, such as direct memory access control, or the like.

Finally, the image data is sent to a host computer. The host computer controls the display of the image data on a screen display, printer, or other image reproduction device. The screen display is comprised of a grid of pixels. For a color screen display, each pixel has, for instance, a red, green, and blue projection device associated with it for projecting a certain intensity of each of the colors.

Oftentimes, it is desirable to modify the color of a reproduced image. One reason is that color images fed to two differently designed screen displays will not have the same appearance. However, the color image on a particular screen display can be converted to look the same as the appearance on another by manipulating the intensity of signals in the image data path between the scanning device and the host computer. Another reason is that sometimes it is desirable to transform the image from one color space having a first set of primary colors, such as red, green, and blue, into a different color space having a second set of primary colors, such as the CIEXYZ primary colors.

Traditionally, color modification can be performed by introducing analog circuitry between the CCDs and the analog-to-digital convertor. The analog circuitry mixes the analog signals in order to adjust their intensities most efficiently. The electrical signals at this stage in image processing are at relatively low power. Consequently, operational amplifier (op-amp) circuits are well suited for this purpose.

However, the use of analog circuitry, such as op-amps to perform color modification is not desirable in many situations. The analog circuitry requires much space, or "real estate." Moreover, controlling the modification is burdensome and not programmable.

SUMMARY OF THE INVENTION

In the present invention, an image scanner provides digital color image data representing an image. Moreover, novel matrix multiply logic is connected to the image scanner logic. The novel matrix multiply logic optimizes, corrects, or modifies the intensities of each individual color encoded in the digital color image data via multiplication of the image data by a 3-by-3 matrix. The novel matrix multiply logic can even transform the colors in one color space to colors in another color space.

FEATURES AND ADVANTAGES OF THE INVENTION

The present invention overcomes the deficiencies of the prior art, as noted above, and further provides for the following additional advantages.

The present invention provides a color correction/optimization system and method which can be used to modify the color of an image reproduced on a screen display.

In accordance with the present invention, a novel 3-by-3 matrix multiplier performs a series of one-stage multiplications and additions on digital image data to modify color.

In accordance with the present invention, color modification can be programmable via software directed to the matrix multiplier. As a result, color correction/optimization can easily be implemented depending upon a particular model of screen display. Moreover, the colors in one color space can be transformed into the colors of another color space, such as the well-recognized CIEXYZ color space.

The present invention further provides for a novel 3-by-3 matrix multiplication without the need for a traditional digital multiplier, which is complex and which takes up much real estate. The circuitry for performing 3-by-3 matrix multiplication can perform negative and positive multiplications in a novel space-saving manner, in accordance with the present invention.

The nine multiplications regarding the 3-by-3 matrix are all performed in the multiplier using the same set of adders via time-multiplexing. Such a configuration trades off speed for a savings in real estate.

The present invention can be implemented on an application specific integrated circuit (ASIC) to extremely reduce the size of the 3-by-3 matrix multiply logic.

Further advantages of the present invention will become apparent to one skilled in the art upon examination of the following drawings and the detailed description. It is intended that any additional advantages be incorporated herein.

BRIEF DESCRIPTION OF THE DRAWINGS

The present invention, as defined in the claims, can be better understood with reference to the text and to the following drawings.

DETAILED DESCRIPTION OF THE PREFERRED EMBODIMENT

Figure 1:
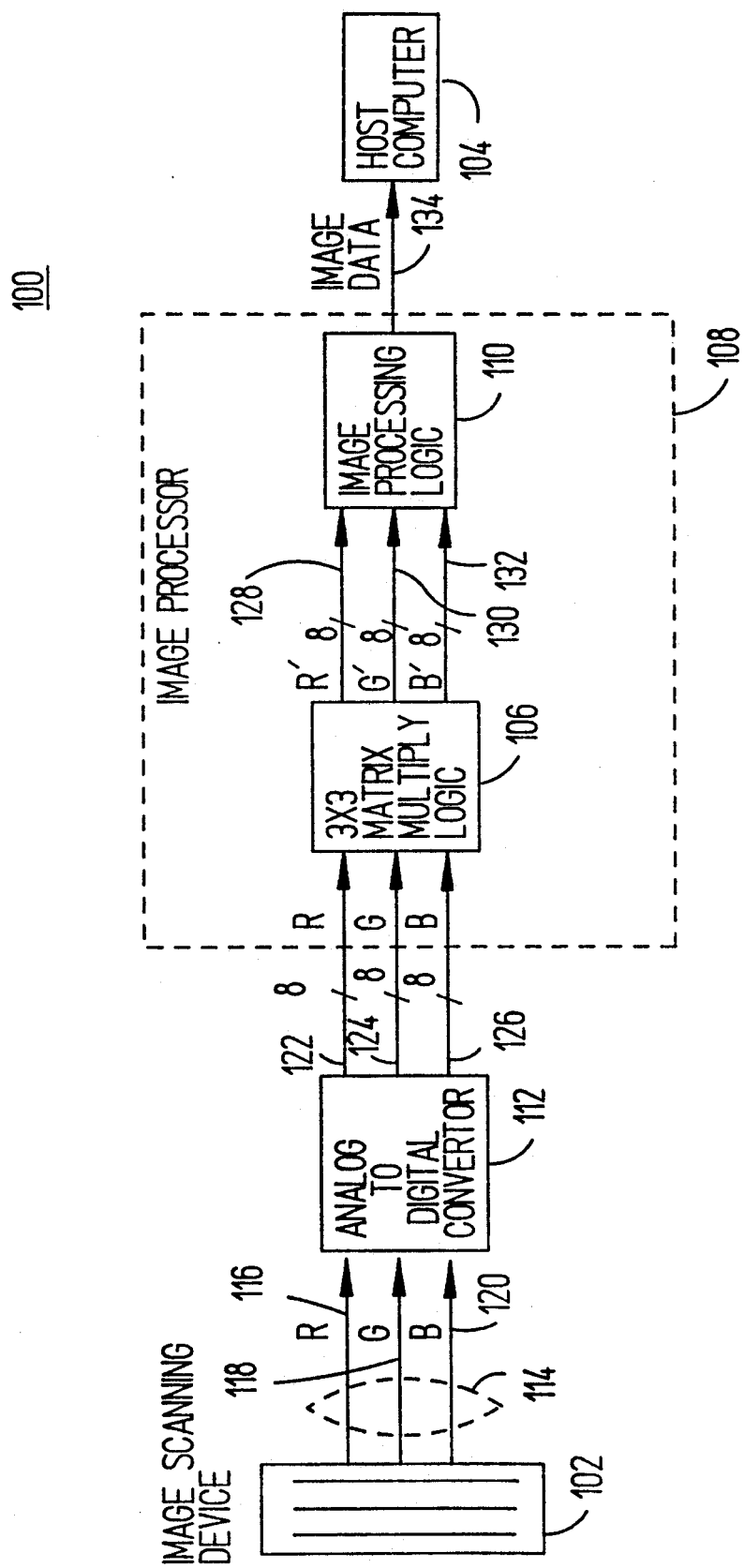
FIG. 1 illustrates novel matrix multiply logic positioned within the image data path between an image scanning device, which could include, for example, a charge couple device (CCD), and a host computer in order to modify color in accordance with the present invention.

FIG. 1 illustrates the image data path between an color image scanning device 102, which could include, for example, a charge couple device (CCD), and a host computer 104. In accordance with the present invention, a novel 3-by-3 matrix multiply logic 106 is implemented within an image processor 108, having other image processing logic 110, in order to modify color image data from an analog-to-digital convertor 112.

The present invention envisions that color modification can be performed on the color picture elements (pixels) of a display image via multiplying the digital signal intensities of the three primary colors by a 3-by-3 matrix. In some sense, the multiply operation essentially mixes the primary colors, much like mixing color lights on a white surface. For example, in a color space having the three primary colors red, green, and blue, some of the signal intensity allocated to the green and blue is mixed with the red; some of the red and blue with the green; and some of the red and green with the blue. Moreover, a tristimulus color space having a set of three primary colors can be converted into a different tristimulus color space having a completely different set of primary colors, in accordance with the present invention.

With reference to FIG. 1, analog image data corresponding to each of the three primary colors is individually and concurrently made available in time by an image scanning device 102 on lines 114. For purposes of discussion, the color space used in the preferred embodiment is arbitrarily chosen to include the primary colors of red (R), green (G), and blue (B). In FIG. 1, the lines 114 comprise a bus 116 for red analog image data, a bus 118 for green analog image data, and a bus 120 for blue analog image data. During each time period dedicated to a particular pixel, the analog image data on each of the buses 116, 118, and 120 is available simultaneously.

For providing the foregoing data in a simultaneous fashion, the image scanning device 102 could comprise a beamsplitter as taught in U.S. Pat. No. 4,709,144 to Vincent, U.S. Pat. No. 4,870,268 to Vincent et al., and U.S. Pat. No. 4,806,750 to Vincent. However, the image scanning device 102 could include any conventional device or combination for providing concurrent color image data. It is envisioned that in some conventional scanning devices, image data pertaining to each color is not retrieved at the same instance in time. However, the image data could be temporarily placed into a storage buffer until all three analog color signals related to a pixel are retrieved, and then all three analog color signals could be forwarded concurrently. It is intended that any such configuration be incorporated herein.

Next, an analog-to-digital convertor 112 transforms the analog signals on buses 116, 118, and 120 into digital signals on respective buses 122, 124, and 126. The foregoing conversion is well known in the art.

The digitized color image data now enters the image processor 108, where manipulation of the image occurs, as discussed in further detail below. Finally, the processed image data is sent in serialized fashion to the host computer 104, as indicated by an arrow 134.

While in the image processor 108, the color image data undergoes some manipulation by the 3-by-3 matrix multiply logic 106 and by the processing logic 110. The processing logic 110 is not particularly relevant to the present invention, but is shown for the purpose of conveying a clear understanding of the present invention. The processing logic 110 could include, for example, scaling logic, logic for adjusting the contrast and/or brightness of an image, communication circuitry for handling communications between itself and the host computer, such as direct memory access control, and so forth.

The 3-by-3 matrix multiply logic 106 performs the following operation on the digitized color image data for each pixel:

$$\begin{vmatrix} a_{11} & a_{12} & a_{13} \\ a_{21} & a_{22} & a_{23} \\ a_{31} & a_{32} & a_{33} \end{vmatrix} \cdot \begin{vmatrix} R \\ G \\ B \end{vmatrix} = \begin{vmatrix} R' \\ G' \\ B' \end{vmatrix}$$

wherein:

$R$ = red digitized image data
$G$ = green digitized image data
$B$ = blue digitized image data
$a_{11}-a_{33}$ = arithmetic coefficients of 3-by-3 matrix $R'$ = modified red digitized image data
   = $a_{11}*R + a_{12}*G + a_{13}*B$ $G'$ = modified green digitized image data
   = $a_{21}*R + a_{22}*G + a_{23}*B$ $B'$ = modified blue digitized image data
   = $a_{31}*R + a_{32}*G + a_{33}*B$ As shown above, in order to modify each pixel, it requires a total of 9 multiplications and 6 additions.

Figure 2:
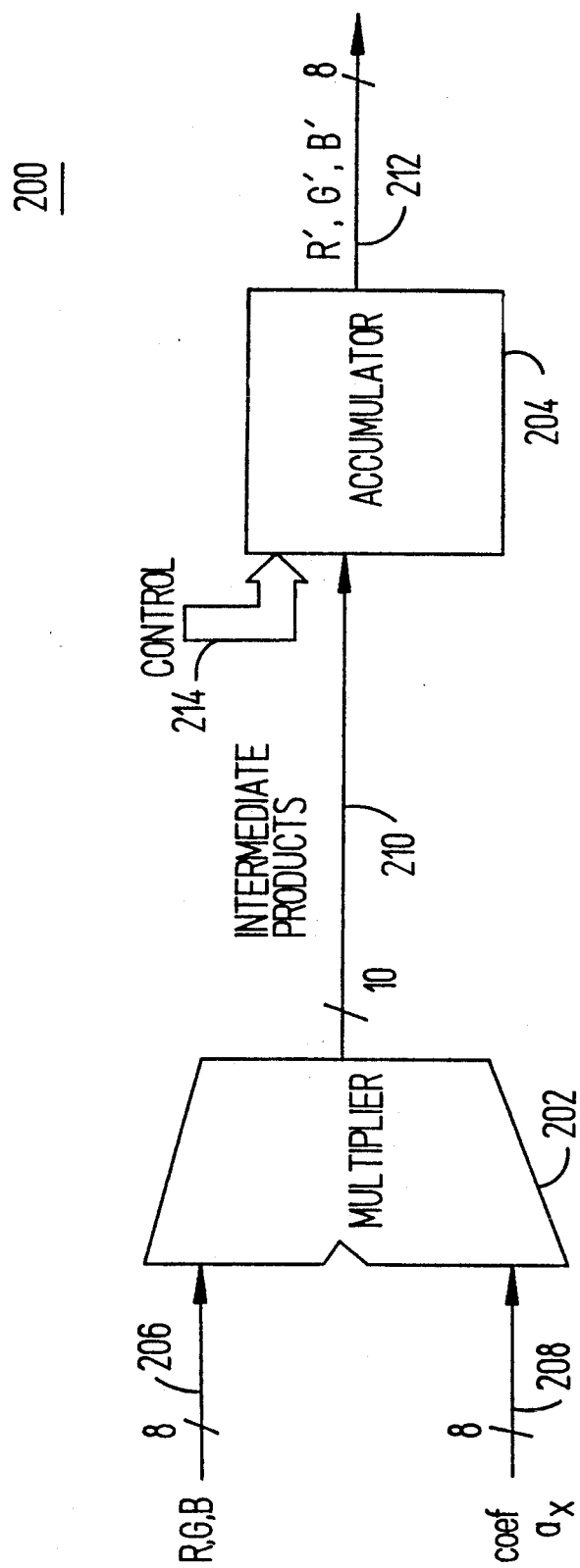
FIG. 2 shows a block diagram of the matrix multiply logic of FIG. 1.

FIG. 2 shows a block diagram of the 3-by-3 matrix multiply logic 106 of FIG. 1. As shown in FIG. 2, the 3-by-3 matrix multiply logic 106 has a novel multiplier 202 and an accumulator 204.

For each color, three multiplications and two additions must be performed. The novel multiplier 202 performs the multiplications and the accumulator 204 performs the additions in a cumulative manner.

In operation, the image data on each of the buses 122, 124, and 126 of FIG. 1 is time multiplexed so as to input all 8-bit color values on an 8-bit input bus 206 shown in FIG. 2. Thus, an 8-bit color intensity value corresponding to one of the colors R, G, or B enters on bus 206 (one of 122, 124, or 126 in FIG. 1), while one of the nine 8-bit coefficients $a_{11}-a_{33}$ enters on bus 208.

As an example, consider the case when an $R_1'$ value is to be generated, where $R_1' = a_{11}*R_1 + a_{12}*G_1 + a_{13}*B_1$. If an 8-bit $R_1$ value enters on bus 206, then the corresponding 8-bit coefficient $a_{11}$ would enter on bus 208.

The multiplier 202 then performs the multiplication of the 8-bit $R_1$ value and the 8-bit coefficient $a_{11}$ to produce an intermediate product $P_{R1} = a_{11}*R_1$. Because the multiplication of two 8-bit numbers can generate an intermediate product having many more bits, if fully represented, the output bus 210 of the multiplier 202 is designed to provide a 10-bit product $P_{R1}$ in order to ultimately provide 8 significant bits at the accumulator output 212. However, some rounding does occur to provide the 10-bit product $P_{R1}$, as will be discussed in further detail later in this document.

The accumulator 204 receives and temporarily holds the intermediate product $P_{R1}$, until receiving the next intermediate product related to $R_1'$, i.e., $P_{G1} = a_{12}*G_1$. The accumulator 204 will add the foregoing intermediate products to derive an intermediate sum $S_{R1}$ and then wait for the intermediate product $P_{B1} = a_{13}*B_1$. After receiving the intermediate product $P_{B1}$, it is added to the intermediate sum $S_{R1}$ in order to derive the $R'$ value. The $R_1'$ value is then outputted from the accumulator 204 on the bus 212. The $R_1'$ value is outputted concurrently with the $G_1'$ value and the $B_1'$ value which are generated from parallel and like-in-kind accumulators.

Figure 3:
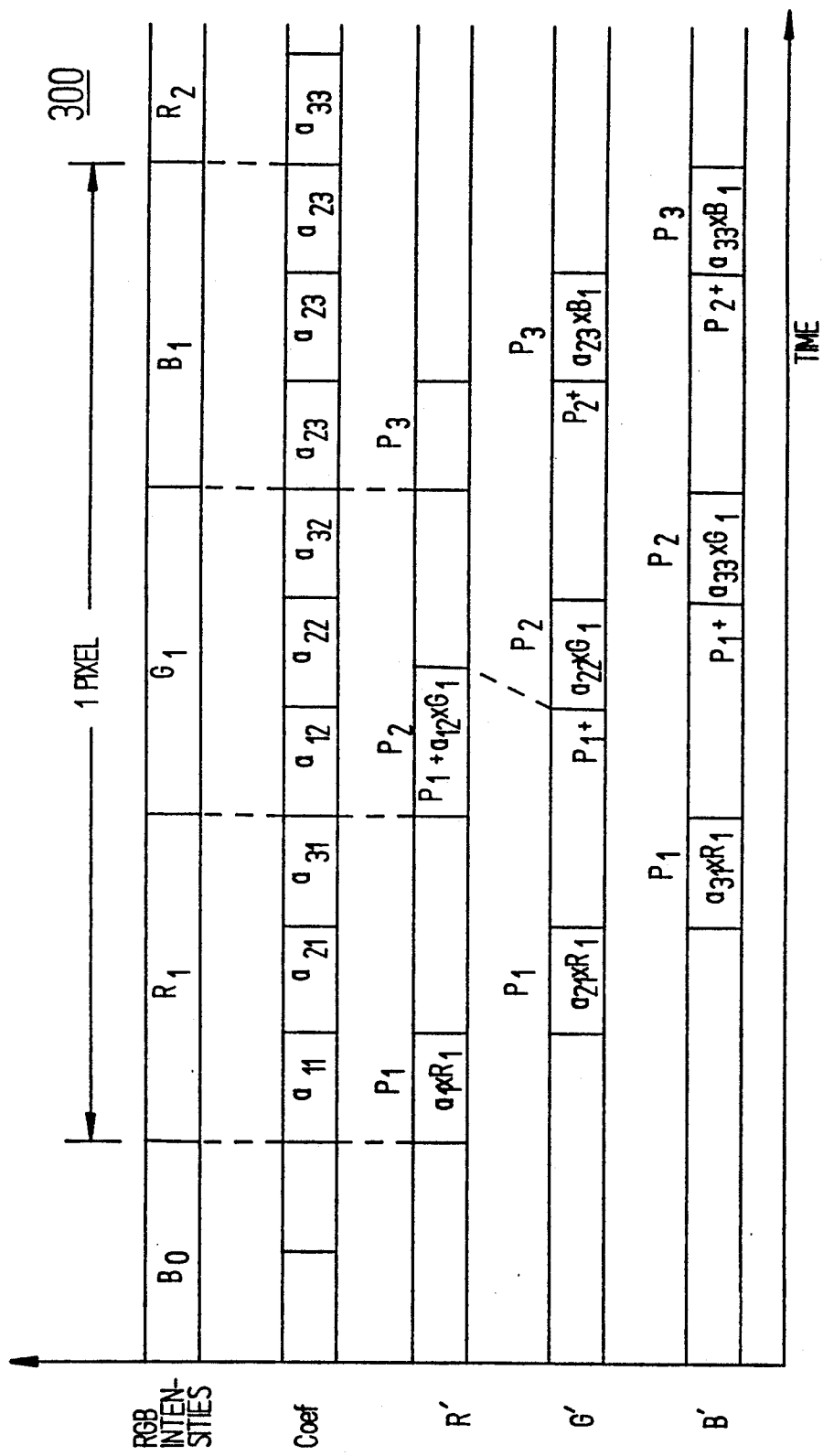
FIG. 3 illustrates a timing diagram for the matrix multiply logic of FIG. 2, wherein the color intensity values (vertical axis) are fed in a time-multiplexed manner to the matrix multiply logic over time (horizontal axis)

FIG. 3 shows a timing diagram for the novel multiplier 202 and accumulator 204 of FIG. 2. As shown, the coefficients $a_x$ are sequentially rotated, or time multiplexed, through the multiplier 202, along with the individual color intensity values.

As shown in FIG. 3, the 8-bit red, green, and blue intensity values are introduced into the multiplier 202 at different times. For each pixel, the red intensity value $R_1$ is introduced first in the preferred embodiment, followed by the green intensity value $G_1$ and then the blue intensity value $B_1$.

Figure 4:
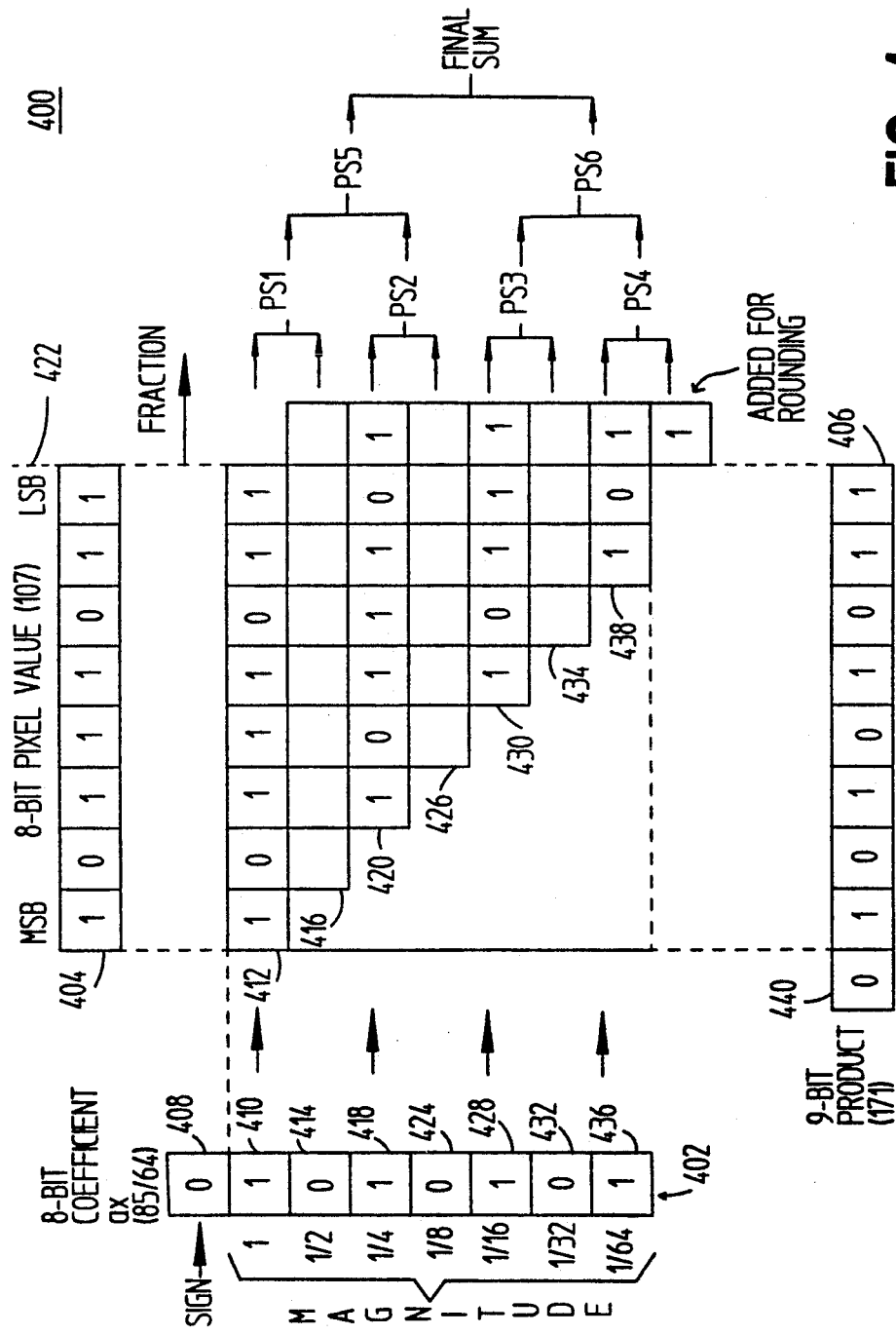
FIG. 4 shows graphically the methodology for performing multiplication within the multiplier of FIG. 2, in accordance with the present invention.

FIG. 4 illustrates the methodology for performing multiplication in the multiplier 202. As previously discussed, the multiplier 202 must perform 9 multiplications with the coefficients $a_{11}-a_{33}$ for each pixel. The multiplications are time multiplexed through the same hardware in order to save space at the expense of higher speed which could be achieved with parallel hardware.

As an example, as shown in FIG. 4, a single 8-bit coefficient $a_x$, denoted by a reference numeral 402, is multiplied by a single 8-bit pixel intensity value 404 of a corresponding color to derive a single intermediate product 406. In the preferred embodiment, any coefficient $a_x$ can have a magnitude ranging between $+2$ and $-2$ in steps of $1/64$, as shown. To this end, the first bit of the 8-bit coefficient $a_x$ is a sign bit 408 and the other bits represent the magnitudes in increments of $1/64$, as shown. The reason for providing a range between $+2$ and $-2$ is that such a range provides for flexible color matrixing. Any color can be increased or decreased by up to 200 percent, if necessary.

The present invention envisions performing the necessary multiplication operations by decomposing each multiplication operation into a series of adding operations having additive values with different bit sizes (different word widths). More specifically, the coefficient 402 is compared with the pixel value 404 in order to derive a series of values with decreasingly bit sizes, shown in FIG. 4 as a triangle configuration.

The methodology proceeds as follows. First, consider the MSB position 410 of the coefficient 402. The MSB position represents an entire pixel magnitude in the preferred embodiment. Because a "1" resides in this bit position, the entire value of the original pixel 404 is needed. Accordingly, the entire pixel value 404 is repeated in the first row 412 of the triangle.

Next, consider the coefficient bit position 414 which represents ½ of the magnitude of pixel value 404. Because a "0" resides in this bit position 414, no part of the pixel value 404 is needed, and thus, no value is shown at the row 416 of the triangle. However, if a "1" did reside in the bit position 414, then ½ of the entire pixel value 404 would be needed. In the binary system, it is well known in mathematics that ½ of any binary number can be easily derived by shifting the entire binary number over by one digit, which would be in the horizontal direction in the FIG. 4. Analogously, in the decimal system, if a decimal number is shifted by one digit, the resultant decimal number is 1/10 of the original value. The preceding concept is better demonstrated when considering the coefficient bit position 418.

The coefficient bit position 418 represents ¼ of a pixel magnitude. Because a "1" exists in the bit position 418, ¼ of the pixel value 404 is needed. To get ¼, the pixel value 404 must be shifted two digits, because (½)*(½)=(¼). Thus, the pixel value 404 is shifted two digits and is shown at row 420 of the triangle. Any digits to the right of the axis 422 is a fraction. In the preferred embodiment, only 1 bit of fraction is retained for accuracy.

The foregoing procedure continues until reaching the coefficient bit position 436, which in this instance, has a "1". Because the bit position 436 represents 1/64, 1/64 of the pixel value is needed. In order to get 1/64, wherein 1/64=6*(½), the pixel value 404 must be shifted 6 digits.

The above methodology is implemented, in effect, in the preferred embodiment via enable/disable control on adders associated with the adding operations and appropriately selected subsets of the original 8-bit bus, as will be discussed further below in regard to FIG. 5.

Referring back to FIG. 4, one adding operation involves combining the values in the first two rows of the triangle configuration to generate a partial sum PS1. Another adding operation involves combining the values in the next two columns to produce a partial sum PS2, and so on for partial sums PS3 and PS4. Note that the sum PS4 accounts for rounding. Needless to say, each of the adding operations involves additives with different bit sizes (word widths). Furthermore, the partial sums PS1 and PS2 are then combined to produce a partial sum PS5, while the partial sums PS3 and PS4 are combined to produce a partial sum PS6. Finally, the partial sums PS5 and PS6 are combined to derive the overall sum, which is essentially equal to the product 406. Worth noting is that each of the foregoing partial sums have unique widths.

Figure 5:
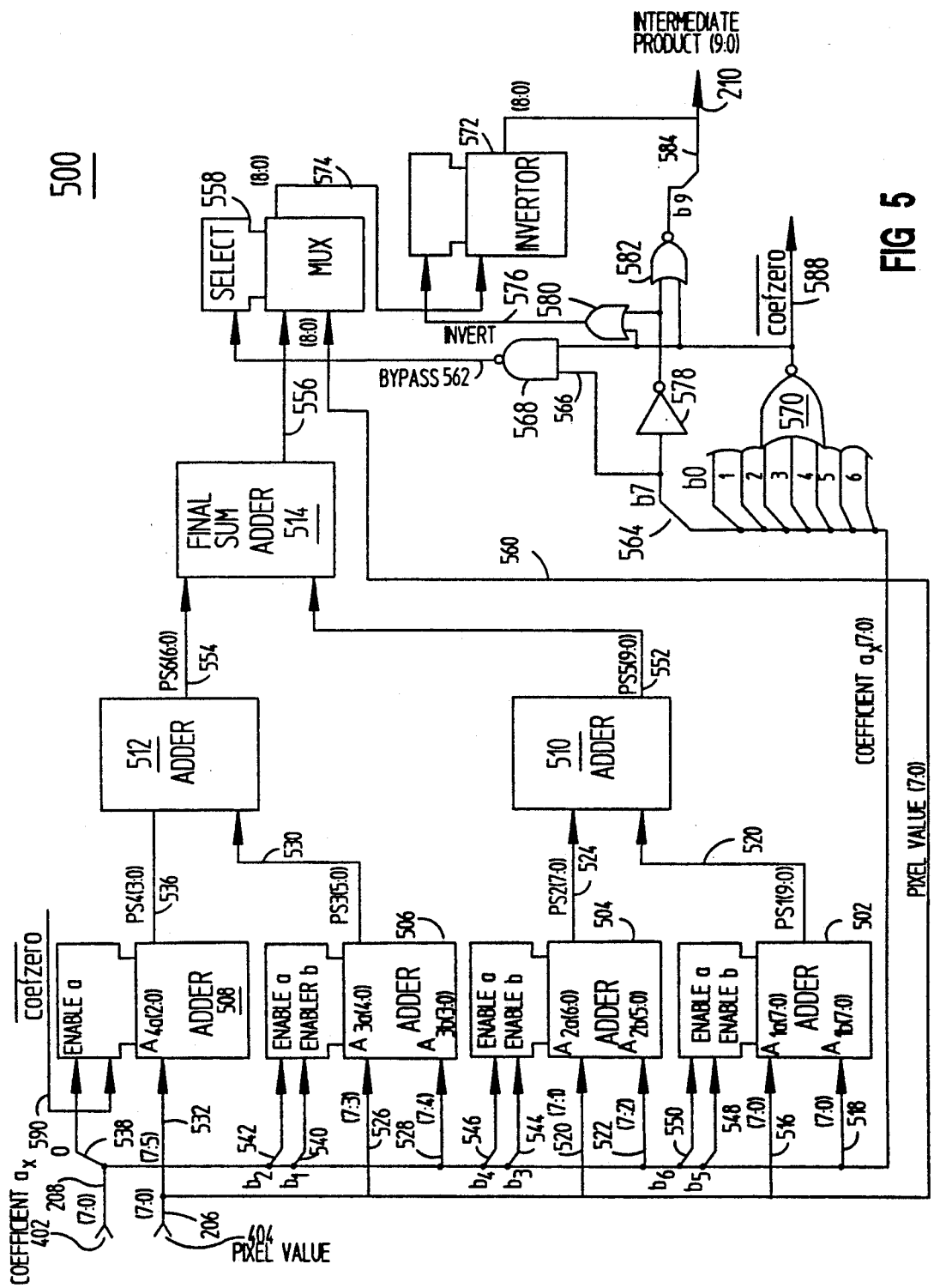
FIG. 5 shows a low level block diagram of the multiplier of FIG. 2, in accordance with the preferred embodiment.

FIG. 5 shows a low level block diagram of the novel multiplier 202, in accordance with the preferred embodiment, which is configured to implement the methodology as set forth in FIG. 4. The novel multiplier 202 comprises a series of adders 502-514 having additives with different bit sizes (word widths).

The adder 502 combines two 8-bit additives on buses 516 and 518 to derive a 10-bit partial sum PS1 on a bus 520. The adder 504 combines a 7-bit additive and a 6-bit additive on respective buses 520 and 522 to derive an 8-bit partial sum PS2 on a bus 524. The adder 506 combines a 5-bit additive and a 4-bit additive on respective buses 526 and 528 to derive a 6-bit partial sum PS3 on a bus 530. Finally, the adder 508 combines 3-bit additive and a 1-bit additive (for rounding) on respective buses 532 and 590 to derive a 4-bit partial sum PS4 on a bus 536.

Essentially, to derive the additive inputs for the adders 502-508, subsets of the inputted pixel value 404 on the bus 206 are selectively channelled to the adders 502-508 and are controlled via enables on the respective adders. Furthermore, as shown, the coefficient $a_x$ 402 inputted on the bus 208 is bit-sliced so that two bits control the enables on each adder.

Adder 502 has two input terminals $A_{1a}$ and $A_{1b}$ coupled to busses 206 and 208 respectively. Input terminals $A_{1a}$ and $A_{1b}$ have a bit width equal to the maximum width of a maximum width of 8-bits. Adder 504, 506 and 508 all have input terminals with bit widths that are progressively less than the previous adder. For example in the preferred embodiment the relationship is as follows: $A_{1a}$=8-bits, $A_{1b}$=8-bits, $A_{2a}$=7-bits, $A_{2b}$=6-bits, $A_{3a}$=5-bits, $A_{3b}$=4-bits and $A_{4a}$=3-bits.

More specifically, bit 0 (b0) of coefficient $a_x$ is directed to the adder 508 for enabling/disabling the bus 532. Bit 1 (b1) and bit 2 (b2) of the coefficient $a_x$ is directed to the adder 506 for enabling/disabling the bus 528 and/or the bus 526, respectively. Bit 3 (b3) and bit 4 (b4) of the coefficient $a_x$ is directed to the adder 504 for enabling/disabling the bus 522 and/or the bus 520, respectively. Finally, bit 5 (b1) and bit 6 (b2) of the coefficient $a_x$ is directed to the adder 502 for enabling/disabling the bus 518 and/or the bus 516, respectively.

The adder 510 combines the partial sums PS1 and PS2 to derive a 10-bit partial sum PS5 on a bus 552. Moreover, the adder 512 combines the partial sums PS3 and PS4 to produce a 7-bit partial sum PS6 on a bus 554. Finally, the adder 514 combines the partial sums PS5 and PS6 to derive a 9-bit sum on a bus 556. It should be noted that the signal on bus 556 corresponds with the product 406 of FIG. 4, wherein a bit b8 440 serves as an overflow to ultimately preserve the accuracy of the 8 bits b7-b0.

In accordance with another feature of the present invention, a multiplexor 558 is provided as shown in FIG. 5 to permit the inputted pixel value to bypass the multiplier altogether. The pixel value bypasses the multiplier via a bus 560. Bypassing the multiplier is desirable when the coefficient $a_x$ is 1. Further, bypassing is desirable for purposes of testing.

The multiplexor 558 is controlled through a line 562. In the preferred embodiment, setting the coefficient $a_x$ to "−0" (decimal) causes a bypass to occur. To achieve this functionality, the sign bit b7 of the coefficient $a_x$ is transmitted via lines 564 and 566 to a logic NAND gate 568, which provides the signal to line 562. Further, the magnitude bits 0 through 6 are sent through a logic NOR gate 570 and then inputted to the logic NAND gate 568.

In accordance with still another feature of the present invention, multiplication is easily performed with a coefficient $a_x$ which can have either a positive or negative sign. When the coefficient is negative, subtraction in effect must take place. In order to perform subtraction via addition, the 2's complement of the coefficient is derived. Adding the 2's complement of a negative number yields the same result as subtracting the magnitude of the negative number.

In order to derive the 2's complement, any word having a negative sign is first inverted and then added to one, which procedure is well known in the art. In the preferred embodiment, the inversion occurs within the multiplier 202, while the addition to one occurs within the accumulator 204. An invertor 572 is situated as shown in FIG. 5 to receive the output of the multiplexor 558 via a bus 574.

The inversion operation performed by this invertor 572 replaces the need to track positive and negative signs during the adding operations of FIG. 5. In traditional logic circuitry, signs would need to be tracked in order to perform such computations. So-called "look ahead" circuitry is usually needed. Thus, traditional logic circuitry is more complex than in the present invention.

In the preferred embodiment, the invertor 558 inverts the value if the final sum should have been negative, and does not invert the value if the final sum should have been positive. The invertor 572 is controlled through a line 576. The logic generating the signal on line 576 includes an invertor, the NOR gate 570, and a NOR gate 580. Based upon the foregoing logic as well as the sign and magnitude of the coefficient $a_x$, the invertor 572 will allow the output on bus 574 of multiplexor 558 to bypass if either (1) the coefficient $a_x$ is negative or (2) the magnitude is zero and the coefficient $a_x$ is negative. Otherwise, the invertor 572 will invert the multiplexor output on the bus 574.

In order to inform the accumulator 204 to add 1 to perfect the 2's complement operation on a negative number, a sign bit b9 is provided to the final sum via a line 584. The logic generating the sign bit b9 comprises the logic NOR gate 582 along with the invertor 578 and the logic NOR gate 570, which monitor the sign of the coefficient $a_x$ and zero magnitude of the pixel value, respectively. The intermediate product is provided with a negative sign bit when the coefficient $a_x$ is negative and nonzero. Otherwise, the final product is provided with a positive sign bit.

Figure 6:
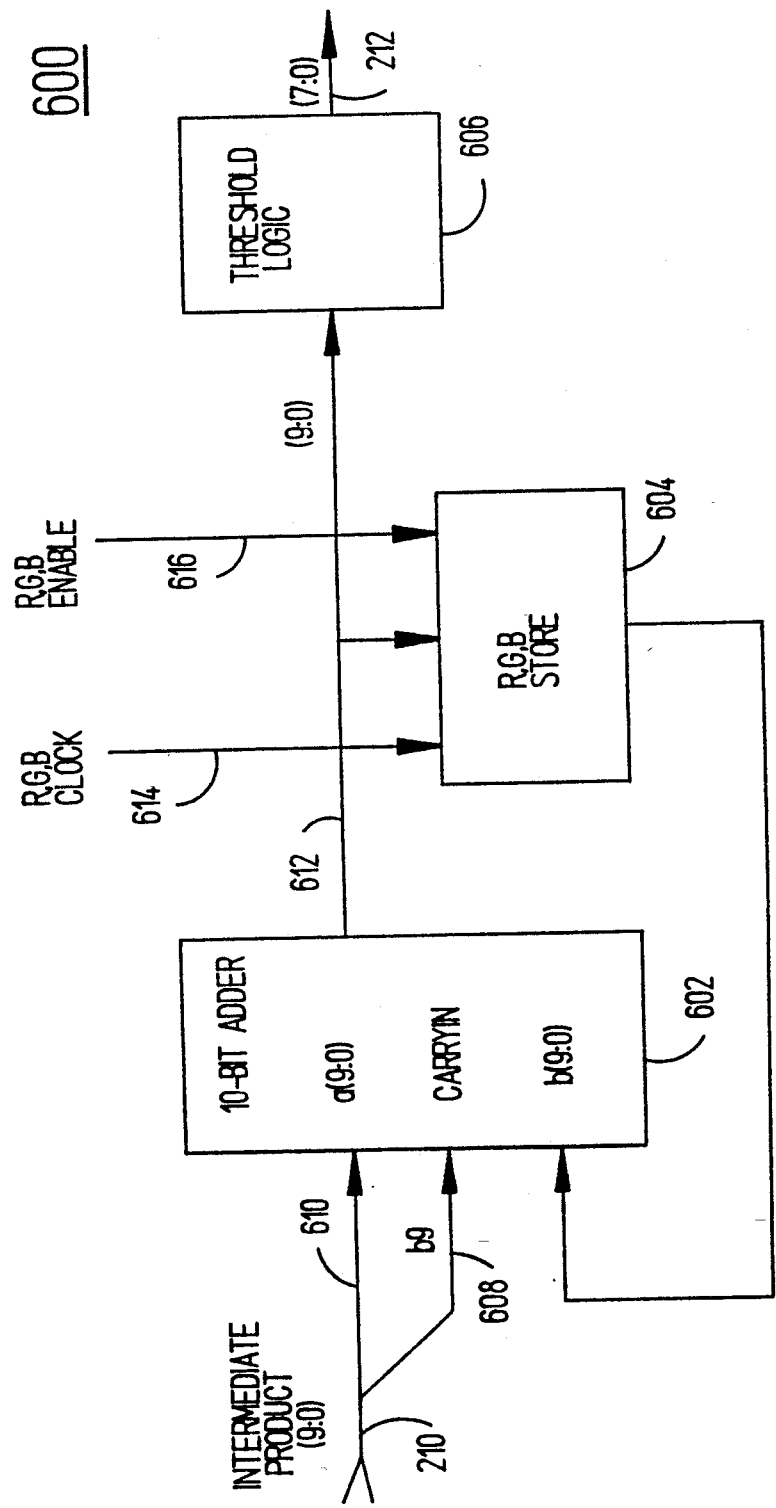
FIG. 6 illustrates a low level block diagram of the accumulator of FIG. 2, in accordance with the preferred embodiment.

FIG. 6 shows a low level block diagram of the accumulator 204 of FIG. 2. The accumulator, as shown in FIG. 6, has a simple 10-bit adder 602, an R,G,B store 604, and threshold logic 606.

The 10-bit adder 602 receives the 10-bit intermediate products from the multiplier 202. The 10-bit words from the multiplier 202 comprises a sign bit b9, an overflow bit b8, and magnitude bits b7-b0. The sign bit b9 is connected to the carryin port 608 of the 10-bit adder 602. Essentially, the sign bit b9 invokes the addition of a 1 to an inputted negative value, to thereby complete the 2's complement operation initiated in the multiplier 202. The 10-bit adder 602 adds the bits b9-b0 (sign bit b9; overflow bit b8) 610 of two 10-bit products to provide a single output 612 with 10 bits b9-b0 (sign bit b9; overflow bit b8).

The R,G,B store 604 stores separately for each of the three colors, intermediate products $P_1$ and $P_2$ of FIG. 3, which are to be added to successive values transmitted from the multiplier 202. Further, the R,G,B store 604 is clocked by a clock 614 and is controlled by an enable 616. The foregoing control directly follows upon examination of FIG. 3.

The threshold logic 606 transforms the 10-bit signed value on bus 612 to an 8-bit unsigned pixel value on bus 212. To this end, the threshold logic 606 considers the sign bit b9 and the overflow bit b8. Valid pixel values are between 0 and 255, because 8 bits are available. If a "1" exists in the overflow bit position b8, then the value is greater than 255, or "overflow" has occurred. Accordingly, the value on bus 212 is rounded to 255 (b7:b0=1) by the threshold logic 606. Moreover, if a "1" resides in the sign bit position b9, then the value is negative, or "underflow" has occurred. Thus, the value on bus 212 is defaulted to 0 (b7:b0=0) by the threshold logic 606.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art and to thereby enable those persons skilled in the art to best utilize the present invention in various embodiments and with various modifications as are suited to the particular use contemplated. It is intended that the scope of the present invention be broadly defined by the claims.

I claim the following:

1. A digital coloring matrixing circuit, comprising:
    a digital image sensing device operable to scan red, green and blue colors simultaneously from one location on a document and produce red, green and blue digitized intensity signals as a function of said scan;
    a first bus for transporting said digitized intensity signals;
    a second bus for transporting predetermined coefficient signals;
    a digital multiplier circuit, coupled to said digital image sensing device operable to perform three multiplications for each of said digitized intensity signals by multiplying a digitized intensity signal with a coefficient signal, said digital multiplier circuit comprising:
    a first adder having input terminals $A_{1a}$ coupled to said first bus and $A_{1b}$ coupled to said second bus, operable to produce a partial sum signal at an output terminal of said first adder;
    a second adder having input terminals $A_{2a}$ coupled to said first bus and $A_{2b}$ coupled to said second bus, operable to produce a partial sum signal at an output terminal of said second adder;
    a third adder having input terminals $A_{3a}$ coupled to said first bus and $A_{3b}$ coupled to said second bus, operable to produce a partial sum signal at an output terminal of said third adder;
    a fourth adder having an input terminal $A_{4a}$ coupled to said first bus, operable to produce a partial sum signal at an output terminal of said fourth adder;
    where the bit widths of the adder input terminals have the following relationships:

$$A_{1a} \geq A_{1b} > A_{2a} > A_{2b} > A_{3a} > A_{3b} > A_{4a};$$

a fifth adder, coupled to said first and second adders, operable to receive said partial sum signals from said first and second adders and produce a partial sum at an output terminal of said fifth adder;
    a sixth adder, coupled to said third and fourth adders, operable to receive said partial sum signals from said third and fourth adders and produce a partial sum at an output terminal of said sixth adder; and
    a final sum adder, coupled to said fifth and sixth adders, operable to receive said partial sum signals of said fifth and sixth adders and produce a final sum at an output terminal of said final sum adder.

2. An 8-bit digital multiplier for multiplying a 3×3 color matrix, comprising:
    a first bus for transporting pixel value signals;
    a second bus for transporting coefficient value signals;
    a first adder having an 8-bit wide first input terminal coupled to said first bus, an 8-bit wide second input terminal coupled to said second bus, and a 10-bit wide output terminal;
    a second adder having a 7-bit wide first input terminal coupled to said first bus, a 6-bit wide second input terminal coupled to said second bus, and an 8-bit wide output terminal;

a third adder having a 5-bit wide first input terminal coupled to said first bus, a 4-bit wide second input terminal coupled to said second bus, and a 6-bit output terminal;

a fourth adder having a 3-bit first input terminal coupled to said first bus and a 4-bit wide output terminal;

a fifth adder, coupled to said output terminals of said first and second adder, and having a 10-bit wide output terminal;

a sixth adder, coupled to said output terminals of said third and fourth adders, and having a 7-bit wide output terminal; and a final sum adder, coupled to said output terminals of said fifth and sixth adders, and having a 9-bit output terminal.

3. The multiplier of claim 2, further comprising an enable/disable means coupled to said fourth adder for disabling said first input terminal of said fourth adder when bit 0 of said coefficient value signal on said second bus is a logic 0.

4. The multiplier of claim 2, further comprising an enable/disable means coupled to said second adder for disabling said first input terminal of said second adder when bit 2 of said coefficient value signal on said second bus is logic 0 and for disabling said second input terminal of said second adder when bit 1 of said coefficient value signal on said second bus is logic 0.

5. The multiplier of claim 2, further comprising an enable/disable means coupled to said third adder for disabling said first input terminal of said third adder when bit 4 of said coefficient value signal on said second bus is logic 0 and for disabling said second input terminal of said third adder when bit 3 of said coefficient value signal on said second bus is logic 0.

6. The multiplier of claim 2, further comprising and enable/disable means coupled to said fourth adder for disabling said first input terminal of said fourth adder when bit 6 of said coefficient value signal on said second bus is logic 0 and for disabling said second input terminal of said fourth adder when bit 5 of said coefficient value signal on said second bus is logic 0.

* * * * *